United States Patent [19]

Oyama et al.

[11] Patent Number: 4,593,070

[45] Date of Patent: Jun. 3, 1986

[54] IMPACT-RESISTANT PHENOLIC RESIN COMPOSITION

[75] Inventors: Motofumi Oyama, Yokosuka; Yoichiro Kubo, Yokohama, both of Japan

[73] Assignee: Nippon Zeon Co., Ltd., Tokyo, Japan

[21] Appl. No.: 707,148

[22] Filed: Mar. 1, 1985

[30] Foreign Application Priority Data

Mar. 1, 1984 [JP] Japan ................................. 59-39618

[51] Int. Cl.$^4$ ............................................. C08L 61/10
[52] U.S. Cl. ............................ 525/139; 188/250 R; 192/12 R; 523/158; 525/119; 525/120; 525/122; 525/134; 525/142; 525/502; 260/998.13
[58] Field of Search ............... 525/139, 142, 134, 502, 525/119, 120, 122; 523/158; 260/998.13

[56] References Cited

U.S. PATENT DOCUMENTS

| | | | |
|---|---|---|---|
| 3,449,470 | 6/1969 | Grabowski | 525/315 |
| 3,607,981 | 9/1971 | Morris | 525/193 |
| 3,673,276 | 6/1972 | Keller et al. | 565/139 X |
| 3,950,454 | 4/1976 | Hensley et al. | 525/289 |
| 3,992,014 | 11/1976 | Retford | 525/313 |
| 4,020,039 | 4/1977 | Dunn et al. | 525/305 |
| 4,083,891 | 4/1978 | Bowers et al. | 525/139 |
| 4,218,548 | 8/1980 | Mageli et al. | 525/313 |
| 4,348,491 | 9/1982 | Bertolucci et al. | 524/456 |

*Primary Examiner*—Theodore E. Pertilla
*Attorney, Agent, or Firm*—Sherman and Shalloway

[57] ABSTRACT

An impact-resistant phenolic resin composition comprising 99 to 25% by weight of a phenolic resin and 1 to 75% by weight of a nitrile group-containing highly saturated polymer rubber whose amount of bound nitrile ranges from 10 to 60% by weight and having an iodine value not exceeding 120.

7 Claims, No Drawings

IMPACT-RESISTANT PHENOLIC RESIN COMPOSITION

This invention relates to a composition comprised of a phenolic resin and a nitrile group-containing highly saturated polymer rubber, which composition exhibits superior impact resistance over a wide range of temperatures from low to elevated temperatures even after having been aged under heat in air or oil.

The phenolic resins are being used industrially in electric and electronic equipment, communication equipment, automobiles, rolling stocks, etc. The phenolic resins per se are inferior in impact resistance and flexibility. For improving on this defect, it has been the practice to mold them after blending them with various fillers or reinforcing agents such as wood flour, vinylon, rubber, asbestos, carbon black, etc. Since the improvement in the impact resistance of a molded article is especially great when the acrylonitrile/butadiene copolymer rubber (NBR) has been blended, such a composition has been widely used in the past (e.g. U.S. Pat. No. 4,348,491, etc.).

There is however a demand for an improvement in the durability of this composition in view of the fact that the equipment and components are becoming more sophisticated and the conditions under which the equipment are being used are becoming more harsh, as well as for achieving a maintenance-free operation. Hence, because the molded products obtained from the mixture of the conventional NBR and phenolic resins were poor in their impact resistance at elevated temperatures, they could not be used stably over a prolonged period of time.

An object of this invention therefore is to provide a composition of a phenolic resin and rubber, wherein the impact resistance at elevated temperatures of a molded product of this composition before heating-aging in air or oil and even after such a heat-aging has been improved.

As a composition that can achieve this object, there is provided according to this invention a composition comprising 99 to 25% by weight of a phenolic resin and 1 to 75% by weight of a nitrile group-containing highly saturated polymer rubber whose amount of bound nitrile ranges from 10 to 60% by weight and having an iodine value not exceeding 120. The nitrile group-containing highly saturated polymer rubber used in this invention must be one whose amount of bound nitrile is from 10 to 60% by weight. If this amount is less than 10% by weight, its compatability with the phenolic resin suffers, and sufficient impact resistance cannot be obtained. On the other hand, if the amount exceeds 60% by weight, the impact resistance at low temperatures becomes poor. The amount of bound nitrile preferably ranges from 20 to 50% by weight.

Further, the iodine value of the foregoing rubber must be from 0 to 120 for the composition to demonstrate superior shock resistance over a wide range of temperatures from low to elevated temperatures before aging and after aging in air or oil. The iodine value is preferably from 0 to 80.

Examples of the nitrile group-containing highly saturated polymer rubber usable in this invention are the unsaturated nitrile/conjugated diene copolymer rubber whose conjugated diene unit portion has been hydrogenated; the unsaturated nitrile/conjugated diene/ethylenically unsaturated monomer terpolymer rubber and this rubber whose conjugated diene unit portion has been hydrogenated; and the unsaturated nitrile/ethylenically unsaturated monomer-type copolymer rubber. These nitrile group-containing highly saturated polymer rubbers can be obtained by the customary polymerization techniques and usual hydrogenation methods. It goes without saying that there is imposed no particular restriction in this invention as to the method of producing the aforesaid rubber.

Examples of the monomers that are used in producing the nitrile group-containing highly saturated polymer rubber are such unsaturated nitriles as acrylonitrile and methacrylonitrile; such conjugated dienes as 1,3-butadiene, 2,3-dimethylbutadiene, isoprene and 1,3-pentadiene; such unsaturated carboxylic acids as acrylic acid, methacrylic acid, itaconic acid and maleic acid, and the salts thereof; such unsaturated carboxylates as methyl acrylate and 2-ethylhexylacrylate; such unsaturated carboxylic acid alkoxyalkyl esters as methoxy acrylate, ethoxyethyl acrylate and methoxyethoxyethyl acrylate; and such unsubstituted or N-substituted (meth)acrylamides as (meth)acrylamide, N-methylol(meth)acrylamide, N,N'-dimethylol(meth)acrylamide and N-ethoxymethyl(meth)acrylamide.

The unsaturated nitrile/ethylenically unsaturated monomer-type copolymer rubber may be one in which a part of the unsaturated monomer portion has been substituted by a monomer unit derived from such non-conjugated dienes as vinylnorbornane, dicyclopentadiene, 1,4-hexadiene, etc.

As specific examples of the nitrile group-containing highly saturated polymer rubber that can be used in the present invention, mention can be made of the hydrogenated products of say the butadiene/acrylonitrile copolymer rubber, isoprene/butadiene/acrylonitrile copolymer rubber and isoprene/acrylonitrile copolymer rubber; the butadiene/methyl acrylate/acrylonitrile copolymer rubber, buadiene/acrylic acid/acrylonitrile copolymer rubber and butadiene/ethylene/acrylonitrile copolymer rubber, and the hydrogenated products of these rubbers; as well as the butyl acrylate/ethoxyethyl acrylate/vinylchloroacetate/acrylonitrile copolymer rubber and butyl acrylate/ethoxyethyl acrylate/vinylnorbornane/acrylonitrile copolymer rubber.

The composition of this invention, which contains at least one rubber chosen from those mentioned hereinabove, may also contain other rubbers to an extent that there is no deviation from the objects intended by the present invention.

The term "iodine value" of the rubber, as used herein, is a value that is determined by the JIS Method K-0070.

The phenolic resins that can be used in the present invention are those usually referred to generically as phenolic resins, which are obtained by reacting a phenol such as phenol, cresol or chlorophenol with formaldehyde using an acid or alkali catalyst. As specific examples, included are the unmodified phenolic resins, cashew-modified phenolic resins, epoxy-modified phenolic resins and elastomer-modified phenolic resins.

In compounding the nitrile group-containing highly saturated rubber and the phenolic resin in the composition of this invention, the former is used in an amount of 1 to 75% by weight, while the latter is used in an amount of 99 to 25% by weight. If the proportion in which the rubber is mixed is less than 1% by weight, no improvement in impact resistance can be had. On the other hand, if the amount of rubber exceeds 75% by weight, the abrasion resistance suffers. The rubber is preferably mixed in a proportion of 5 to 60% by weight, and more preferably 10 to 50% by weight.

The composition of this invention is mixed in a mixer along with the various compounding agents that are usually used in the phenolic resin art, for example, such inorganic fibers as those of glass, asbestos, carbon, wollastonite and steel; natural and synthetic organic fibers such as vinylon and Kevlar; inorganic and organic powders such as of molybdenum disulfide, silica, petroleum coke, graphite, talc, cashew, metals and carbon; a phenolic resin curing agent such as hexamethylenetetramine; and optionally a vulcanizing agent of rubber and/or a thermosetting resin, following which the mixture is heat-melted and mixed on rolls at 150° C. The resulting kneaded product is heat-molded in a mold to a shape in accordance with its intended use, followed by a heat-treatment to give the final product.

There is imposed no particular restriction as to the application of the composition of this invention, but in view of its possession of the characteristics hereinbefore described, it is expected to demonstrate conspicuous effects when used as a binder for friction materials such as clutch plates, brake shoes and brake linings.

The following examples will serve to illustrate the present invention more specifically.

EXAMPLE 1

Hydrogenated NBRs and hydrogenated acrylonitrile/butadiene/butyl acrylate terpolymer rubbers having the iodine values shown in Table 1 were prepared by dissolving emulsion polymerized NBR and butadiene/butyl acrylate/acrylonitrile terpolymer rubber in methyl isobutyl ketone followed by hydrogenation of the solutions using a Pd-carbon catalyst.

After melt-blending on heating rolls 25 parts by weight of each of the rubbers shown in Table 1 with 75 parts by weight of a phenolic resin (SUMILITE RESIN PR-12687, a product of Sumitomo-Durez Company, containing about 8% of hexamethylenetetramine), 10 parts by weight of molybdenum disulfide and 50 parts by weight of talc, the mixture was formed into a sheet, after which the sheet was cured at 160° C. for 30 minutes. The sheet thus obtained was mechanically processed to prepare test pieces for the Izod impact strength test in accordance with the JIS Method K-7110.

TABLE 1

| | Rubber used | | | | | | | |
|---|---|---|---|---|---|---|---|---|
| | Acrylonitrile/butadiene copolymer rubber | | | | | Acrylonitrile/butadiene/butyl acrylate copolymer rubber | | |
| Composition | A | B | C | D | E(*) | F | G | H |
| Bound acrylonitrile (wt. %) | 37 | 37 | 45 | 37 | 33 | 35 | 35 | 35 |
| Butyl acrylate | — | — | — | — | — | 60 | 35 | 35 |
| unit portion (wt. %) | | | | | | | | |
| Iodine value | 103 | 51 | 25 | 159 | 308 | 23 | 138 | 23 |

*Unhydrogenated NBR

A hot air aging test at 150° C. for 14 days (in accordance with JIS Method K-6301) was conducted for judging the impact strength after aging under heat, after which the Izod impact test was carried out at room temperature (23° C.) and 120° C. The results obtained are shown in Table 2. In the same table are also shown the results of the Izod impact test after the test pieces were dipped in JIS No. 3 oil. The dipping was carried out in accordance with JIS Method K-6301 at 150° C. for 14 days. The Izod impact test was conducted in accordance with JIS Method K-7110.

TABLE 2

| | | Run No. | | | | | | | |
|---|---|---|---|---|---|---|---|---|---|
| | | Invention Examples | | | | | Comparative Examples | | |
| | | 1 | 2 | 3 | 4 | 5 | 6 | 7 | 8 |
| | Measurement | Rubber used | | | | | | | |
| Item tested | temperature | A | B | C | H | F | E | D | G |
| Izod impact strength before aging (kg · cm/cm) | 23 (°C.) | 7.9 | 9.5 | 8.6 | 8.1 | 7.7 | 4.5 | 5.2 | 4.8 |
| | 120 (°C.) | 8.1 | 9.2 | 8.8 | 7.3 | 6.5 | 4.1 | 4.9 | 4.4 |
| Izod impact strength after aging under hot air (kg · cm/cm) | 23 (°C.) | 4.1 | 4.6 | 4.3 | 3.9 | 3.5 | 1.8 | 1.7 | 1.5 |
| | 120 (°C.) | 3.9 | 4.5 | 4.1 | 4.1 | 2.8 | 0.7 | 0.6 | 0.9 |
| Izod impact strength after dipping in heated JIS No. 3 oil (kg · cm/cm) | 23 (°C.) | 4.7 | 5.1 | 4.9 | 5.0 | 4.5 | 1.8 | 1.8 | 1.7 |
| | 120 (°C.) | 4.2 | 4.7 | 4.1 | 4.4 | 3.6 | 1.1 | 1.1 | 1.0 |

EXAMPLE 2

Test pieces were prepared as in Example 1 by admixing 40 parts by weight of SRF carbon black and 2.0 parts by weight of sulfur in 100 parts by weight of a blend of phenolic resin and rubber (B or E) (the weight ratios of the blends are shown in Table 3), after which the mixture was melted and formed into a sheet and pressed. The Izod impact strengths at 23° C. and 120° C. after aging under heat and after dipping in heated JIS No. 3 oil were then measured using these test pieces. The results obtained are shown in Table 3. The aging and dipping were carried out under the same conditions as in Example 1.

TABLE 3

| | | Run No. | | | | | | | | |
|---|---|---|---|---|---|---|---|---|---|---|
| | | Invention Examples | | | | Comparative Examples | | | | |
| | | 9 | 10 | 11 | 12 | 13 | 14 | 15 | 16 | 17 |
| | | Rubber/phenolic resin blend ratio | | | | | | | | |
| | | 65/35 | 50/50 | 25/75 | 10/90 | 65/35 | 50/50 | 25/75 | 10/90 | 0.5/99.5 |
| | Measurement | Rubber used | | | | | | | | |
| Item tested | temperature | B | B | B | B | E | E | E | E | E |
| Izod impact strength before | 23 (°C.) | 14.0 | 13.1 | 7.7 | 3.0 | 9.5 | 7.0 | 4.2 | 2.4 | 1.7 |

TABLE 3-continued

| | | Run No. | | | | | | | | |
|---|---|---|---|---|---|---|---|---|---|---|
| | | Invention Examples | | | | Comparative Examples | | | | |
| | | 9 | 10 | 11 | 12 | 13 | 14 | 15 | 16 | 17 |
| | | Rubber/phenolic resin blend ratio | | | | | | | | |
| | | 65/35 | 50/50 | 25/75 | 10/90 | 65/35 | 50/50 | 25/75 | 10/90 | 0.5/99.5 |
| | | | | | | Rubber used | | | | |
| Item tested | Measurement temperature | B | B | B | B | E | E | E | E | E |
| aging (kg · cm/cm) | 120 (°C.) | 10.2 | 9.8 | 7.8 | 3.2 | 7.3 | 6.5 | 3.6 | 1.9 | 2.0 |
| Izod impact strength after | 23 (°C.) | 5.9 | 5.6 | 4.1 | 2.5 | 3.0 | 2.0 | 1.8 | 1.2 | 0.9 |
| aging under hot air (kg · cm/cm) | 120 (°C.) | 4.2 | 5.7 | 3.4 | 2.3 | 1.1 | 0.9 | 0.8 | 0.5 | 0.6 |
| Izod impact strength after | 23 (°C.) | 9.1 | 8.9 | 4.5 | 2.6 | 3.0 | 2.7 | 1.9 | 1.4 | 1.1 |
| dipping in heated JIS No. 3 oil (kg · cm/cm) | 120 (°C.) | 7.4 | 7.8 | 4.1 | 2.4 | 1.2 | 1.1 | 1.2 | 0.4 | 0.7 |

EXAMPLE 3

Rubber B (25 parts by weight), 75 parts by weight of a phenolic resin shown in Table 4, 40 parts by weight of SRF carbon black and 6 parts by weight of hexamethylenetetramine were melt-blended and formed into a sheet, after which test pieces were prepared as in Example 1. These test pieces were tested for their impact strengths at 23° C. and 120° C. after aging under heat and after dipping in heated JIS No. 3 oil. The results obtained are shown in Table 5. The aging under heat and dipping were carried out under identical conditions as in Example 1.

TABLE 4

| No. | Class of phenolic resin | Trade name |
|---|---|---|
| I | Cashew-modified phenolic resin | SUMILITE RESIN PR-18686 (product of Sumitomo-Durez Co.) |
| J | Oil-modified phenolic resin | SUMILITE RESIN PR-13349 (product of Sumitomo-Durez Co.) |
| K | Unmodified phenolic resin | SUMILITE RESIN PR-50235 (product of Sumitomo-Durez Co.) |
| L | Cashew-modified and cresol-modified phenolic resin | SUMILITE RESIN PR-50975 (product of Sumitomo-Durez Co.) |

TABLE 5

| | | Run No. | | | | | |
|---|---|---|---|---|---|---|---|
| | | Invention Examples | | | | Comparative Examples | |
| | | 18 | 19 | 20 | 21 | 22 | 23 |
| | | Phenolic resin used | | | | | |
| | | I | J | K | L | I | K |
| | Measurement | Rubber used | | | | | |
| Items tested | temperature | B | B | B | B | E | E |
| Izod impact strength before aging (kg · cm/cm) | 23 (°C.) | 7.8 | 7.6 | 6.9 | 7.7 | 4.4 | 4.2 |
| | 120 (°C.) | 7.2 | 7.1 | 6.4 | 7.2 | 4.1 | 3.6 |
| Izod impact strength after aging under hot air (kg · cm/cm) | 23 (°C.) | 4.7 | 4.5 | 4.1 | 4.6 | 2.0 | 1.7 |
| | 120 (°C.) | 4.3 | 4.5 | 3.8 | 4.2 | 1.0 | 0.8 |
| Izod impact strength after dipping in heated JIS No. 3 oil | 23 (°C.) | 4.9 | 4.6 | 4.4 | 4.4 | 2.1 | 1.8 |
| | 120 (°C.) | 4.3 | 4.2 | 3.9 | 4.1 | 0.9 | 0.8 |

As can be appreciated from the results obtained in the examples given above, the blended composition of this invention composed of a specific rubber and a phenolic resin shows a great improvement over the NBR/phenolic resin blended composition in its elevated temperature impact strength after aging under hot air or after dipping in hot oil.

What is claimed is:

1. An impact-resistant phenolic resin composition comprising 99 to 25% by weight of a thermosetting phenolic resin and 1 to 75% by weight of a nitrile group-containing highly saturated polymer rubber whose amount of bound nitrile ranges from 10 to 60% by weight and having an iodine value not exceeding 120.

2. The composition of claim 1 wherein the amount of bound nitrile of the nitrile group-containing highly saturated polymer rubber is from 20 to 50% by weight, and its iodine value does not exceed 80.

3. The composition of claim 1 wherein said nitrile group-containing highly saturated polymer rubber is contained in an amount ranging from 5 to 60% by weight.

4. The composition of claim 1 wherein said nitrile group-containing highly saturated polymer rubber is at least one rubber selected from the group consisting of the hydrogenated unsaturated nitrile/conjugated diene copolymer rubber, unsaturated nitrile/conjugated diene/another ethylenically unsaturated monomer terpolymer rubber and a hydrogenation product thereof, and unsaturated nitrile/another ethylenically unsaturated monomer copolymer rubber.

5. A friction material using the composition of claim 1 as binder.

6. The composition of claim 1 wherein the thermosetting phenolic resin is derived from a phenolic resin obtained by reacting phenol, cresol, or chlorophenol with formaldehyde in the presence of an acid or alkali catalyst.

7. The composition of claim 6 wherein the phenolic resin is selected from the group consisting of unmodified phenolic resins, cashew-modified phenolic resins, epoxy-modified phenolic resins, and elastomer-modified phenolic resins.

* * * * *